United States Patent Office 3,487,221
Patented Dec. 30, 1969

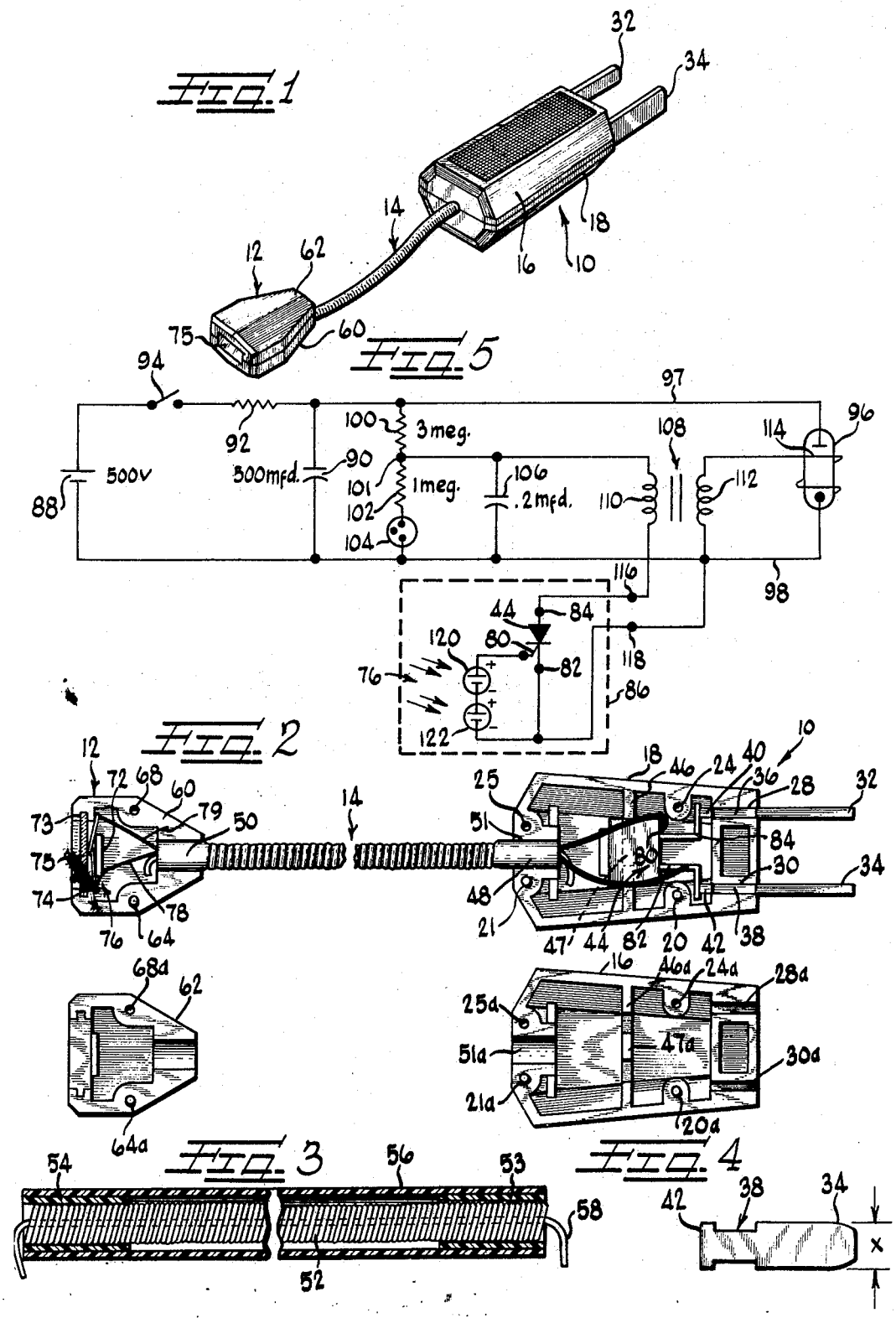

3,487,221
LIGHT ACTIVATED TRIGGER FOR PHOTO-
GRAPHIC FLASH SYSTEM
Louis M. Frank, Morton Grove, Ill., assignor to The
Lase Co., Chicago, Ill., a corporation of Illinois
Filed Nov. 14, 1967, Ser. No. 682,929
Int. Cl. H01j 39/12, 5/02
U.S. Cl. 250—212
12 Claims

ABSTRACT OF THE DISCLOSURE

A light activated switch has a thyristor controlled by a photovoltaic device responsive to at least some predetermined amount of light incident thereon for triggering the thyristor to a conductive state. The switch is contained in a three-sectioned housing, and has characteristics which are particularly suitable for use in conjunction with photographic flash apparatus.

---

The present invention relates generally to light responsive switching of electronic semiconductor devices, and more particularly to a light activated trigger device for firing a secondary or auxiliary strobe light in response to the light emission from a primary source.

It has heretofore been recognized that a need exists in the photography field for a fast photosensitive switch capable of triggering the secondary or "slave" flash units or "strobes" used extensively in multiple-light-source photography. Such flash units are commonly constructed with a relatively large capacitor adapted to be charged by a battery source and connected across a gas flash tube. A smaller trigger capacitor is also adapted to be charged by the battery source, but has a switchable discharge path through the primary of a high voltage transformer and the flash contacts on the camera. The secondary winding of the transformer creates an electric field adjacent the flash tube, which permits the large capacitor to discharge through the tube on closure of the flash contacts, in a manner well known to the art. To employ such a device as a slave flash unit, various triggering circuit and devices have been proposed; however, none have been found to be completely satisfactory in matching the extreme specifications of present day photographic equipment or the critical nature of professional quality photography, while at the same time being of relatively low cost and complexity.

For example, the general concept of employing a discrete passive photoelectric device to activate an electronic switching device in such a slave flash unit is, of course, well known. Various types of photoelectric devices having a photoconductive effect have been proposed and used in conjunction with such flash units. One of the most common devices utilizing a photoconductive effect is the selenium photoconductor, the resistance of which is variable as a function of incident light. Other photoconductors are cadmium sulphide, carmium selenide and lead sulphide. The principal problem connected with the use of such a photoconductor for the present and similar purposes is that the response time is relatively long, and thus tends to be incompatible with the requirement that the slave unit respond to the short duration flash of the primary unit and flash therewith.

A more recent proposal is shown in the General Electric SCR Manuar, 4th edition, on p. 300. This unit employs a relatively new type of semiconductor device which is a light activated silicon controlled rectifier (LASCR) which is substituted for the camera flash contacts otherwise connected to the strobe. The LASCR device has a structure similar to the ordinary silicon controlled rectifier (SCR), except that a glass window is provided on top of the housing so that the incident light will strike the silicon and create hole-electron pairs therein. With the presence of an electric field across the device (provided by the capacitor voltage), a sufficient current will flow to activate or trigger the device. However, flash units with such a device for triggering have been found to be not generally commercially available. This is believed to be due to the fact that for optimum flash performance, such a device must have the ability to withstand the relatively high stand-off voltages necessary for the firing of the flash tube, but because of the inherent construction of such devices, it is believed that they do not have this ability. As such, their utility in slave flash units appears to be impaired, and the result is unsatisfactory performance in meeting the practical requirements for such units.

Accordingly, it is an object of the present invention to provide a light activated triggering device which has an extremely fast response time, e.g., in the nanosecond range, without any impairment of the stand-off voltage characteristics by the light responsive element, while being of extreme simplicity.

It is another object of the present invention to provide such a triggering device which is readily adaptable to most commercial flash units for firing the same in multiple-light-source photography.

It is an additional object of the invention, in its somewhat narrower aspects, to provide such a triggering device which can be manufactured economically, while having a rugged and safe construction, and an arrangement and form so as to be of maximum utility in practice.

These and other objects and aspects of the invention are more particularly set forth in the following detailed description of a preferred embodiment as required by the patent laws, and in the accompanying drawings, of which:

FIGURE 1 is a pictorial ivew in perspective, showing the general arrangement and form of the device in accordance with the embodiment of the invention;

FIGURE 2 is a longitudinal sectional view of the device of FIGURE 1, showing the internal construction thereof;

FIGURE 3 is an enlarged detail view in longitudinal section of the flexible conduit intermediate portion of the device shown in the previous figures;

FIGURE 4 is a detail view of the contact prong employed in the device shown in the previous figures; and FIGURE 5 is a schematic diagram of the electrical circuit constructed in accordance with the present embodiment of the invention, as employed in conjunction with a conventional electronic flash unit.

Referring now to FIGURE 1, there is shown a trigger device constructed in accordance with the invention and employing the teachings thereof. In general, the trigger device comprises a three-sectioned housing having a main housing portion 10, an auxiliary housing portion 12 and an interconnecting intermediate portion 14 therebetween. The main housing portion 10 comprises two half-sections 16 and 18 which are desirably injection molded plastic units, each having interlocking pins 20 and 21, 20a and 21a, respectively, as shown in FIGURE 2. These molded pins engage symmetrically located holes 24 and 25, 24a and 25a, respectively located in the opposite housing half-sections.

It will be seen that the half-sections 16 and 18 are actually identical for economy in manufacture and have reinforcing and component-supporting webs and fillets molded therein. Thus, a description of the upper housing sections in FIGURE 2 will suffice for the lower, and vice versa, the portions of the lower sections having the suffix a.

More particularly, slots 28 and 30 are provided in the end of each main housing half-section to firmly retain a pair of male contact prongs 32 and 34 therein. These prongs, one of which is shown in detail in FIGURE 4, are adapted to electrically connect the trigger device to most conventional electronic flash units, and suitable adapters (not shown) may be easily provided for connection to flash units having some other type of connector. The prongs, 32 and 34, have a generally T-shaped portion, 36 and 38 respectively, which securely engages the slots 28 and 30 with the cross-bar or T portions 40 and 42, respectively, extending transversely to the plane of the half-section members. The blade portion of each prong is desirably of a different width, indicated as X in FIGURE 4, to ensure proper polarity when used with connectors so adapted.

An encapsulated or encased conventional silicon controlled rectifier 44, of any suitable type, is securely supported by the molded webs 46 and 46a, each of which has a generally rectangular recess therein for receiving the SCR, and has a short tab portion 47 extending transversely to the plane of the half-section and oriented transversely to the longitudinal axis of the device to support the SCR from the opposite sides, as shown in FIGURE 2.

The main housing portion 10 functions also as the grasping part of the device for inserting and removing same from the flash unit, and has knurled surfaces on the external sides of the half-sections 16 and 18, as shown in FIGURE 1, for this purpose.

The intermediate housing portion 14 has a generally circular cross-section and enlarged circular portions 48 and 50 on the opposite ends thereof. The enlarged end 48 fits snugly into a recessed portion 51 having a curved surface configuration matched to the surface geometry of the end portion. The other half-section 16 being identical to the section 18, has a corresponding construction, and when the sections are pressed together all of the components are firmly secured therein. If desired, the half-sections may be bonded or sealed with suitable known techniques.

The intermediate housing portion 14, in accordance with the present embodiment of the invention, is in the form of a generally circular conduit having a flexible construction, but one which will retain any position in which it is placed so as to permit proper orientation of the auxiliary housing portion 12, which contains the light responsive element, as will be hereinafter described. More particularly, the intermediate housing portion 14 comprises an elongated spring member 52 in its normally non-extended condition, and has at its opposite respective ends, relatively short lengths of heat shrinkable plastic tubing 53 and 54. These lengths are desirably made approximately equal to the surface portions of the housings which engage and secure the enlarged end portions 48 and 50. A further tube 56 of heat shrinkable plastic having a somewhat larger diameter than the tubes 53 and 54 is disposed over the assembly so as to cover the entire length of the spring 52. The entire assembly is heated sufficiently to cause the heat shrinkable plastic tubes to compress upon the spring 52, the double tubing at the ends of the conduit producing the enlarged portions 48 and 50. Thus, these enlarged portions assure a tight fit with the housing portions engaged thereto.

A flexible, but relatively non-resilient, metal wire composed, for example, of copper or other conventional material, is inserted through the core of the spring 52, and has its opposite ends bent over for retention in this position, as shown in FIGURE 3. Consequently, the flexibility of the conduit is provided by the spring 52, while its ability to hold a given position is obtained from the characteristics of the wire 58. The plastic tubing 56 provides a flexible protective covering for this assembly and prevents the entrance of dust or other foreign matter into the device, such tubing of the heat shrinkable type being well known and commercially available.

The auxiliary housing 12 comprises two half-sections 60 and 62 which, like the half-sections of the main housing 10, are made of injection molded plastic having interlocking pins 64 and 64a engaging holes 68a and 68, respectively. Each of the half-sections 60 and 62 has a transversely projecting abutment wall or partition 72 near the forward end thereof and generally U-shaped channels 73 and 74 for receiving a lens 75 forward of and parallel to the partition 72 so as to define a space therebetween. In the specific embodiment described, the window 75 has a rectangular shape and may be made of any suitable light transmissive glass or plastic.

Photovoltaic means, illustrated in the present embodiment as an assemblage of silicon solar cells, is disposed and preferably wedged between the window 75 and the partition 72, the lens and cells being fixed in position when both half-sections 60 and 62 are pressed or joined together. A pair of electrical leads 78 and 79, which may be appropriately color coated for convenience, are respectively connected to the opposite termials of the solar cell assemblage 76. Leads 78 and 79 run through the flexible conduit of the intermediate housing portion 14 and are connected to the thyristor 44, illustrated in the present embodiment as a silicon controlled rectifier, with the positive terminal of the cell assemblage connected to the control or gate electrode 80 and the negative terminal connected to the output electrode or cathode 82, these connections being made by any suitable means such as soldering. The input electrode or anode 84, as well as the cathode 82, may be directly soldered to the ends of the contact prongs 32 and 34, respectively, as shown.

Referring now to FIGURE 5, the electrical schematic of the trigger device in accordance with the present invention is shown within the dotted block 86. The remaining portion of the diagram illustrates a particular electronic flash circuit which is of a common commercial type. In such an electronic flash unit having component values as shown in the drawing, a battery 88, which may have a potential of 500 volts, is serially connected to a relatively large capacitor 90 through a relatively low value isolating resistor 92 and switch 94. A gas flash tube 96 is electrically connected across the capacitor 90 by means of leads 97 and 98, the lead 98 being the negative reference or common. A firing circuit is provided comprising a voltage divider formed by two serially connected resistors 100 and 102 and a neon lamp 104, these components also being connected across the capacitor 90 by means of leads 97 and 98. A relatively smaller capacitor 106 is connected across the resistor 102 and lamp 104, and thus is connected across the voltage divider tap 101 to the negative reference lead 98. A transformer 108 has a primary winding 110, one lead of which is also connected to the voltage divider tap 101, and the other lead is connected to an external terminal 116 of the flash unit. The secondary winding 112 has one lead directly connected to the negative reference lead 98 and the other lead connected to a "tickler" or gas ionizing electrode 114, which is adapted to ionize the gas within the flash tube 96. Another external terminal 118 is provided, and is directly connected to the negative reference lead 98. The external terminals 116 and 118 are normally intended for connection to the flash contacts within the camera.

In the operation of the circuit, closure of the switch 94 charges the capacitor 90 through the resistor 92, and consequently charges the capacitor 106 connected across the voltage divider tap 101. Thus, when a sufficient charge has been developed, the voltage across the tap 101 is sufficient to light the neon lamp 104 indicating that the circuit is ready for operation. Upon shorting the external terminals 116 and 118, the capacitor 106 discharges through the primary winding 110 of transformer 108, causing a very high voltage to appear on electrode 114, which reduces a break-down potential of the flash tube 96 and permits the capacitor 90 to discharge therethrough, producing the light flash. The open circuit voltage across the external contacts 116 and 118 may be about 200 volts max. and typically about 150 to 180 volts.

Turning now to the trigger device indicated generally as 86 in FIGURE 4, it will be noted that the circuit is extremely simple, but performs with a high degree of efficiency. A thyristor electronic switching device, namely, a silicon controlled rectifier 44 has its anode 84 connected directly to the terminal 116 and its cathode 82 connected directly to the terminal 118. The photovoltaic cell assemblage 76 is connected directly across the gate electrode 80 and the cathode 82, and triggers the thyristor to a conductive state when at least a predetermined amount of light is incident thereon.

In accordance with one aspect of the invention, a plurality of solar cells are connected in series to form the photovoltaic assemblage 76, there being shown two cells 120 and 122 having their terminals of opposite polarity connected together so that the voltage from each cell will add to the other. It has been found in certain circuits constructed in accordance with the invention, that the employment of only a single solar cell of conventional type, although operable, may not perform entirely satisfactorily as regards reliably triggering many conventional commercial types of silicon controlled rectifiers, and that substitution of another solar cell having a substantially higher current output will generally not obviate the problem. However, by employing at least two such solar cells in series, satisfactory operation is achieved. This is believed to be due to an inherent limitation on the voltage which can be developed across such a solar cell regardless of the incident light and current output. In this respect, among others, the solar cell differs from a regular battery cell, and behaves in a similar manner to a rectifier diode. By connecting a plurality of such cells together, however, the voltage limitation of each cell is added to that of the others, and the total voltage developed across the entire cell assemblage by the current output of the cells is sufficient to effectively and reliably trigger the SCR.

A specific circuit construction in accordance with the invention employing a General Electric type C106B2 SCR and two Solar Systems' type SS23L solar cells has been found to perform well and exhibits a high degree of sensitivity.

Because the circuit will operate only with the external contacts connected to the proper electrodes of the SCR, the contact prongs 32 and 34 are "keyed" to provide the proper polarity with respect to the flash unit connector, as previously described, although improper connection of the prongs to a socket connector not so adapted will generally not have any deleterious effects on the device. However, as an alternative, a diode bridge may be provided and connected between the SCR and the contact prongs so that whichever orientation the contacts may have, the SCR will always be connected with the proper polarity.

As can be seen from the illustration in FIGURE 1, the general arrangement and form of the device, which might be described as having a "cobra" configuration, has a maximum utility, with each part serving a useful function toward that end, while still being compact and maintaining an attractive appearance.

Various modifications of the embodiment of the invention herein disclosed and described will, of course, be apparent to those skilled in the art; and as such, the scope of the invention should be defined only by the claims, and equivalents thereof.

Various features of the invention are set forth in the following claims.

1. A light activated switch for triggering a slave strobe in a multiple strobe flash system, comprising a thyristor, having input, output and control electrodes, said input and output electrodes being adapted to be connected to an electric source, photovoltaic means including a light sensitive, series connected plurality of semiconductor junctions responsive to light incident thereon from one of said strobes to produce a voltage across the output thereof, and conducting means coupling said output to the control electrode of said thyristor so that said thyristor becomes conductive when at least a predetermined amount of light is incident on said photovoltaic means and appropriate potentials are applied to said input and output electrodes by said source, said photovoltaic means constituting the sole source of electrical current and voltage applied to said control electrode for rendering the thyristor conductive, whereby the photovoltaic action of said photovoltaic means itself triggers the thyristor in response to the incident light.

2. The switch of claim 1 wherein said photovoltaic means comprises at least two discrete cells electrically connected in series relation.

3. The switch of claim 1 wherein said thyristor comprises a silicon controlled rectifier and said photovoltaic means comprises silicon solar cells, said conducting means coupling the output of said cells across the gate and cathode of said silicon controlled rectifier.

4. The switch of claim 1 wherein said photovoltaic means comprises at least two silicon solar cells electrically connected in series relation.

5. The switch of claim 1 further comprising a main housing portion, an auxiliary housing portion, and an intermediate portion therebetween, said main housing portion containing said thyristor, said auxiliary housing portion containing said photovoltaic means and additional means for permitting exposure thereof to incident light, said intermediate portion containing said conducting means and comprising an elongated, flexible self-supporting member disposed between both of said housing portions, and terminal means mounted on said main housing portion for connecting said switch to a device to be controlled, whereby said auxiliary housing portion may be positioned for optimum exposure of said photovoltaic means.

6. The switch of claim 5 wherein said elongated flexible member comprises a conduit and means for retaining said conduit in any desired orientation.

7. The switch of claim 5 wherein said elongated flexible member comprises a flexible and resilient spring, a flexible tube disposed over said spring and in tight engagement therewith, and a relatively non-resilient wire extending longitudinally through said spring to retain said spring in any desired orientation.

8. The switch of claim 5 wherein said main housing portion and said auxiliary housing portion each comprise two molded plastic half-sections of substantially identical structure, including supporting and retaining members integral therewith for fixing said thyristor and said photovoltaic means in rigid relation thereto.

9. The switch of claim 7 wherein said flexible tube is composed of heat shrinkage plastic.

10. The switch of claim 5 wherein said elongated tubular member comprises a flexible and resilient spring, two relatively short tubes disposed on the opposite ends of said spring and in tight engagement therewith, a flexible tube disposed over said spring and said two short tubes and in tight engagement therewith, the opposite ends of said elongated tubular member having a larger cross section dimension than the intermediate portion thereof, and said main housing portion and said auxiliary housing portion having respective surfaces conforming to the geometry of said opposite ends for tight engagement therewith.

11. A light activated switch for triggering a slave strobe in a multiple strobe flash system, comprising light responsive means for providing an electrical response to light incident thereon, a first housing containing said light responsive means therein, said first housing including means for permitting exposure of said light responsive means to incident light from one of said strobes, a thyristor, said light responsive means electrically coupled with said thyristor for controlling the conductive and non-conductive states thereof, a second housing, means fixedly attached to said second housing for mechanically attachment of said switch to said slave strobe and means for electrically connecting said thyristor to said slave strobe, said thyristor being disposed in one of said housings, and an elongated flexible self-supporting member disposed between said first and second housings and fixedly attached to each of said first and second housings so that said first housing may be positioned for optimum exposure of said light responsive means to incident light from said one strobe without requiring any change in the orientation of said slave strobe.

12. The switch of claim 11 wherein said means for mechanical attachment of said switch to said slave strobe and said means for electrically connecting said thyristor to said slave strobe both include rigid terminal members fixedly fastened to said second housing and electrically connected to said thyristor.

References Cited

UNITED STATES PATENTS

| | | | |
|---|---|---|---|
| 3,093,744 | 6/1963 | Tabet | 250—206 X |
| 3,159,755 | 12/1964 | Duncan | 307—311 X |
| 3,209,154 | 9/1965 | Maring | 250—214 |
| 3,350,603 | 10/1967 | Erickson | 315—151 |
| 3,392,284 | 7/1968 | Cain | 250—206 X |

OTHER REFERENCES

G.E. SCR Manual, 3d ed., G.E. Co., Rectifier Components Dept., W. Gehesee St., Auburn, N.Y., pp. 211–214, public date Mar. 23, 1964.

WALTER STOLWEIN, Primary Examiner

U.S. Cl. X.R.

250—239; 307—311